March 29, 1966 R. E. BOYDEN 3,243,023
ROTATABLE SHAFT LOCKING MEANS
Filed Oct. 31, 1963
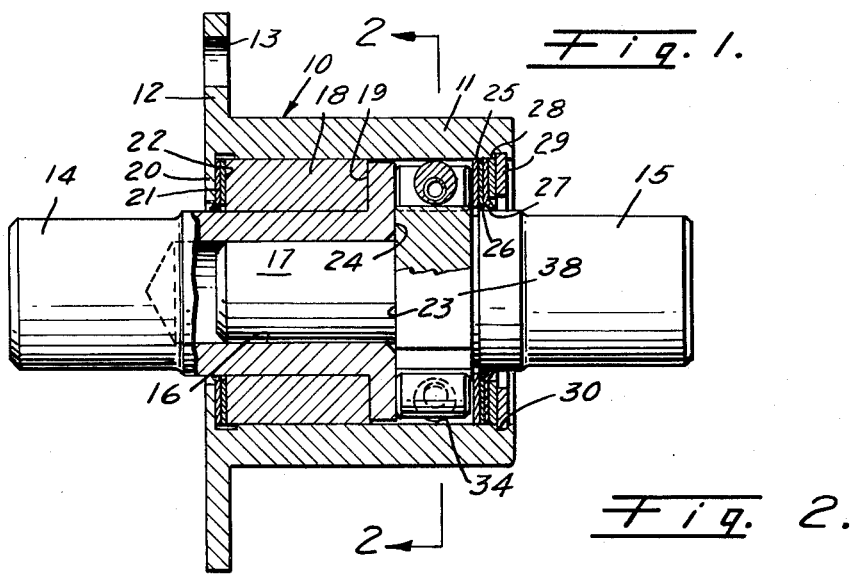
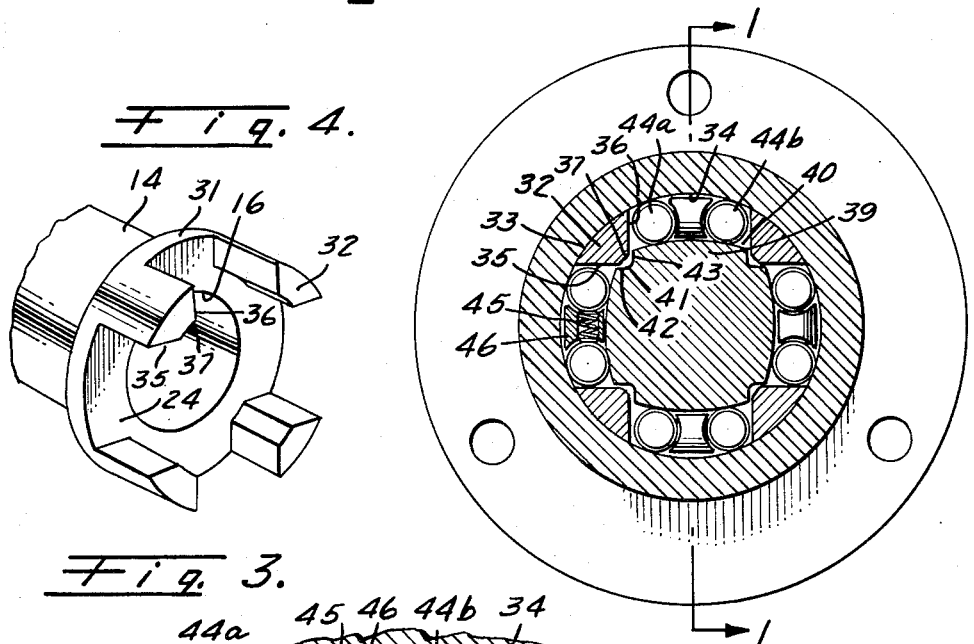
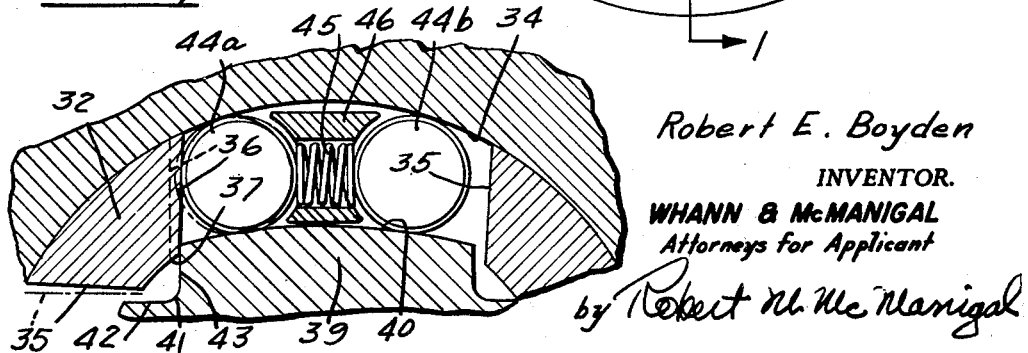
Robert E. Boyden
INVENTOR.
WHANN & McMANIGAL
Attorneys for Applicant United States Patent Office 3,243,023
Patented Mar. 29, 1966

3,243,023
ROTATABLE SHAFT LOCKING MEANS
Robert E. Boyden, Temple City, Calif., assignor to Adams Rite Manufacturing Company, Glendale, Calif., a corporation of California
Filed Oct. 31, 1963, Ser. No. 320,445
5 Claims. (Cl. 192—8)

The present invention relates generally to a device for transmitting torque from a rotary input member to a rotary output member, and is more particularly concerned with means for automatically locking the output member in the absence of input torque.

It is one object of the invention to provide rotatable shaft locking means of rugged, compact construction having extremely high torque transmitting ability, and wherein the use of extreme tolerances has been minimized, thus permitting economic production of a device which will provide efficient operation over long periods of use.

A further object is to provide a device of the character described, wherein the locking mechanism provides increased locking effect, yet will permit operation freely under load.

A still further object is to provide in a rotating shaft locking device, an improved construction in which the locking forces are in diametric opposition, thus providing a balancing effect which eliminates distortion and other undesirable effects.

Another object is to provide in such a device, releasing abutment surfaces for the locking means which are in close proximity to the abutment surfaces for establishing direct drive between the input and output.

It is also an object to provide novel retainer means for the latching springs, which decreases impact forces thereon, maintains the springs in proper operating position, and provides a carrier for a lubricant.

Briefly, the rotatable shaft locking means of the device of the present invention comprises axially aligned input and output shafts having their inner ends telescoped and rotatively supported within a housing having a circumferentially extending inner facing surface. Diametrically arranged multiple clutching assemblies include spring motivated rollers which normally interconnect camming surfaces on the output shaft with the inwardly facing surface, so that the shaft is normally locked against rotative movement. However, upon movement of the input shaft, the latching rollers are released through the action of drive fingers carried by the input shaft, and upon further movement of these fingers establish direct drive between the input and output shaft.

The rollers of each clutching assembly are moved apart into locking position by compression springs encased in a tubular retainer which limits movement of the rollers towards each other and prevents damaging impact forces, as well as provide a carrier for lubricant.

By placing the clutching assemblies in diametric relation, the locking forces are in balanced opposed relation, thus preventing distortion under load.

Further objects of the invention will be brought out in the following part of the specification, wherein detailed description is for the purpose of fully disclosing the invention without placing limitations thereon.

Referring to the accompanying drawings, which are for illustrative purposes only:

FIG. 1 is a side elevational view, including an axial section, of rotatable shaft locking means according to the present invention, taken substantially on line 1—1 of FIG. 2;

FIG. 2 is a transverse sectional view taken substantially on line 2—2 of FIG. 1, showing the cooperative relationship and details of the clutching assemblies;

FIG. 3 is an enlarged fragmentary sectional view, diagrammatically illustrating the operation of a clutching assembly; and FIG. 4 is a fragmentary perspective view showing details of construction of the innermost end of the input shaft as embodied in the device of the invention.

Referring more specifically to the drawings, the rotatable shaft locking means of the present invention are shown, for illustrative purposes, as comprising generally a cylindrical housing 10 having a cupped circular body portion 11 and a radially extending mounting flange 12 at one end, this flange having in the present instance a plurality of circumferentially spaced openings 13 by means of which the housing may be supported in its operative position.

Coaxially mounted within the housing body portion is an input shaft 14 and an output shaft 15 having their outermost ends projecting from the opposite ends of the body portion. The innermost ends of these shafts are in telescoped relation, the input shaft being provided with an axially extending socket 16 which is adapted to receive a reduced inner end portion 17, thus forming a bearing support for the output shaft. The input shaft is supported in a main bearing which is this case is shown as comprising a bushing 18 that surrounds the shaft and is constrained between a shaft shoulder 19 and an inwardly extending end flange 20, a sealing washer 21 and spacing washer 22 being interposed between the bushing and end flange.

The output shaft is provided with an inner shoulder 23 which is adapted to abut against an adjacent shoulder 24 on the input shaft. The output shaft carries a circumferentially extending washer 25 which is spaced outwardly from the shoulder 23 and serves as a retainer for the shaft. A spacer washer 26 and seal washer 27 are interposed between the washer 25 and an outer spacer washer 28, these washers being retained by a snap ring 29 arranged to peripherally seat in a wall groove 30 formed at the adjacent end of the body portion 11.

As best shown in FIG. 4, the input shaft is provided with an enlarged head structure 31 at its innermost end, this head structure having formed thereon a plurality of axially projecting drive fingers 32, in this case being four in number and arranged in quadrature.

As best shown in FIG. 2, the fingers are formed with arcuate outer surfaces 33 permitting rotation within the adjacent inwardly facing circular surface 34 of the inner wall of the body portion 11, and which may constitute a braking surface when the housing is fixedly secured against rotation. Each finger is substantially of triangular cross section and is provided with side walls 35 and 36 in right angled relation. The juncture of these walls is shown as being bevelled at 37.

The output shaft 15 at its innermost end is also provided with a somewhat enlarged head structure 38 which is provided with a plurality of camming lobes 39 which are likewise in quadrature and each provides an outwardly facing camming-wedging surface 40. At their junctures, the camming lobes are separated by axially extending grooves 41, each of these grooves being adapted to receive the bevelled portion 37 of a drive finger 32, and having walls 42 and 43 respectively in right angle relation for coaction with the walls 35 and 36 of the finger to provide limited lost motion relative movement between the input shaft and the output shaft.

As thus constructed, each camming lobe 39 projects between a pair of adjacent driving fingers so that the camming-wedging surface 40 thereof cooperates with the adjacent circular surface 34 to provide a compartment in which a pair of latching rollers 44a and 44b are disposed, these rollers being urged apart by a compression spring 45. The compression spring is carried within a sleeve retainer 46 of a suitable plastic or other material, this sleeve being of greater thickness in its outer periphery than its inner periphery and being arcuate at its ends to conform generally to the roller surfaces. By this arrangement, the retainer sleeve is held against rotation and forms an inner movement limiting member with respect to the associated latching rollers and serves to prevent impact forces being applied to the spring. The sleeve also serves as a carrier for lubricant.

The clutching or latching assembly is more clearly illustrated in the enlarged showing in FIG. 3. By providing the clutching assemblies in diametric opposed relation, it will be apparent that the resulting forces due to the wedging action of the latching rollers will be diametrically opposed and a balanced condition provided which prevents distortion of the parts under load and prolongs the life of the device.

When a driving torque is applied to the input shaft 14, initial relative movement with respect to the output shaft will cause the leading wall of the drive fingers to be initially brought into engagement with the latching roller ahead of it in the direction of rotation, whereupon the roller will be moved out of its wedging position so as to unlock the output shaft for rotation. Continued movement of the drive shaft then brings the finger into direct engagement with one of the walls of the groove 41 so as to establish direct drive between the input shaft and the output shaft. The other latching roller of each clutching assembly will automatically move out of its clutching or wedging position so as not to interfere with rotation of the output shaft.

For example, in FIG. 3, if it is considered that the input shaft is rotated in a direction such that the drive fingers move in a clockwise direction, the fingers will move from the dotted line position towards the locking rollers 44a in each case, and before these fingers reach the full line position of engagement with the groove wall 43, the wall 36 will have engaged the roller and moved it against the action of spring 45 to a non-locking position. Upon establishment of direct drive with the output shaft, movement of the output shaft will be such that the latching roller 44b will tend to move to a non-wedging or non-clutching position. Upon termination of rotation of the input shaft, the spring 45 will act to motivate the latching rollers away from each other into their latching positions. In the absence of further torque forces being applied to the input shaft, any attempt made to move the output shaft by rotating it will cause the camming surface 40 to act and wedge one of the locking rollers against the circular surface 34, depending upon which direction it is endeavored to rotate the output shaft.

The disclosed and described construction lends itself to accurate machining operations which are particularly desirable in order to provide a dependable device which will be trouble free in operation. It will be observed that the finger walls of the diametrical clutching assemblies may be formed by a single machining operation so that greater accuracies in the structure may be obtained. Moreover it will be seen that the wall of a finger 32 which unlatches the adjacent locking roller also engages the adjacent wall of groove 41 to establish direct actuation.

It is believed that it will be apparent from the foregoing description that the objects and advantages of the herein described invention will be carried out and accomplished.

Various modifications may suggest themselves to those skilled in the art without departing from the spirit of my invention, and, hence, I do not wish to be restricted to the specific form shown or uses mentioned except to the extent indicated in the appended claims.

I claim:

1. A shaft locking device, comprising: a housing having a circular braking surface; driving and driven elements rotatably supported in said housing coaxial with the axis of said braking surface and for movement relative thereto; diametrically opposed lobes carried by one of said elements, each of said lobes having a camming-wedging surface spaced from and facing said braking surface; a pair of rotatable wedging locking members disposed between each camming-wedging surface and the adjacent braking surface; resilient means normally urging each pair of locking members away from each other into locking positions respectively between the ends of the associated camming-wedging surface and said braking surface for automatically locking said one of said elements to the housing to hold it in adjusted relative position; and fingers carried by the other of said elements respectively positioned adjacent the ends of each camming-wedging surface, each of said fingers having an abutment surface engageable with a surface of the adjacent lobes upon predetermined reversed directions of rotation of the driving element with respect to said driven element to establish a direct driving relation therebetween, and prior to such direct driving relation release the effective resiliently urged locking member depending upon the direction of rotation of the driving element.

2. A shaft locking device according to claim 1, characterized in that there are two sets of diametrically disposed lobes with the fingers positioned therebetween, each finger being substantially of triangular cross section and having V-surfaces extending into a V-groove positioned between adjacent lobes.

3. A shaft locking device according to claim 2, characterized in that the locking members are rollers, and each pair is urged apart by a compression spring, and including a spring retainer sleeve surrounding the spring and supported thereby to limit the extent of movement of the rollers in a direction towards each other.

4. A shaft locking device according to claim 3, characterized in that the ends of the retainer sleeve are curved to conform generally to the surfaces of the associated rollers.

5. A shaft locking device according to claim 3, wherein the retainer sleeve has a greater thickness on one side than on its opposite side.

References Cited by the Examiner
UNITED STATES PATENTS 1,471,398 10/1923 Inglis.
2,066,167 12/1936 Swartz _____ 192—8

FOREIGN PATENTS 689,190 6/1964 Canada.

DAVID J. WILLIAMOWSKY, *Primary Examiner.*

ARTHUR T. McKEON, *Examiner.*

DON A. WAITE, *Assistant Examiner.*